United States Patent
Harmon et al.

(10) Patent No.: US 11,904,952 B2
(45) Date of Patent: *Feb. 20, 2024

(54) EXTENDABLE CARGO BED SIDE WALL

(71) Applicant: Ford Global Technologies, LLC, Dearborn, MI (US)

(72) Inventors: Michael John Harmon, Northville, MI (US); Ryan Mathew Sandor, North Wales, PA (US); Matthew B. Rutman, Canton, MI (US); Dragan B. Stojkovic, Taylor, MI (US); Amol Borkar, Nagpur (IN); Kirk E. Sanborn, Shelby Township, MI (US); Ronald Meredith, Waterford, MI (US); Jesse Rene Diephuis, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/673,886

(22) Filed: Feb. 17, 2022

(65) Prior Publication Data
US 2023/0257034 A1  Aug. 17, 2023

(51) Int. Cl.
| | |
|---|---|
| *B62D 33/027* | (2006.01) |
| *B62D 33/08* | (2006.01) |
| *B60R 11/06* | (2006.01) |
| *B60P 3/40* | (2006.01) |

(52) U.S. Cl.
CPC ............ *B62D 33/0273* (2013.01); *B60P 3/40* (2013.01); *B62D 33/08* (2013.01); *B60R 11/06* (2013.01); *B62D 33/027* (2013.01)

(58) Field of Classification Search
CPC .. B62D 25/2054; B62D 33/02; B62D 33/027; B62D 33/08; B62D 33/0273; B60P 3/40; B60R 11/06
See application file for complete search history.

(56) References Cited

U.S. PATENT DOCUMENTS

| | | | |
|---|---|---|---|
| 5,150,939 A | 9/1992 | Simin | |
| 5,523,926 A * | 6/1996 | Gold | ...................... B60Q 1/324 340/472 |
| 5,669,654 A * | 9/1997 | Eilers | ...................... B60P 1/003 296/26.11 |

(Continued)

FOREIGN PATENT DOCUMENTS

DE         102010027751 A1      10/2011

OTHER PUBLICATIONS

Multi-Flex Tailgate, 2021 Chevy Silverado, retrieved from https://www.chevrolet.com/new-roads/trucks/silverado-multi-flex-tailgate on Jan. 18, 2022.

(Continued)

*Primary Examiner* — Gregory A Blankenship
(74) *Attorney, Agent, or Firm* — Vichit Chea; Carlson, Gaskey & Olds, P.C.

(57) ABSTRACT

A cargo bed system includes a side wall assembly of a cargo bed. The side wall assembly is configured to transition back-and-forth between a standard wall position and an extended wall position. The side wall assembly include an extendable portion and a fixed portion. The extendable portion extends and retracts relative to the fixed portion when the side wall assembly transitions back-and-forth between the standard wall position and the extended wall position.

19 Claims, 2 Drawing Sheets

(56) References Cited

U.S. PATENT DOCUMENTS

| | | | | |
|---|---|---|---|---|
| 5,816,637 A * | 10/1998 | Adams | ............... | B60P 3/40 296/57.1 |
| 6,367,858 B1 * | 4/2002 | Bradford | ............... | B60P 3/40 296/26.11 |
| 6,601,895 B1 | 8/2003 | Tannenbaum et al. | | |
| 7,055,879 B2 * | 6/2006 | De Gaillard | ............... | B60R 5/041 296/50 |
| 7,070,227 B2 * | 7/2006 | Hunt | ............... | B62D 33/0273 296/183.1 |
| 7,967,356 B2 | 6/2011 | Stackpole | | |
| 8,109,552 B2 | 2/2012 | Nelson | | |
| 8,237,557 B1 * | 8/2012 | Hertz | ............... | B60Q 7/02 340/468 |
| 8,534,735 B2 | 9/2013 | McManus et al. | | |
| 9,481,403 B1 * | 11/2016 | Johnson | ............... | B62D 33/023 |
| 10,077,083 B1 * | 9/2018 | Survis | ............... | B62D 33/0273 |
| 10,173,603 B2 * | 1/2019 | Dunham | ............... | B60R 9/065 |
| 10,472,003 B2 * | 11/2019 | Karumuri | ............... | B62D 33/03 |
| 10,829,059 B1 * | 11/2020 | Addison | ............... | B60P 1/433 |
| 11,059,423 B1 * | 7/2021 | Weaver | ............... | B62D 33/027 |
| 11,772,468 B2 * | 10/2023 | Harmon | ............... | B62D 33/027 296/100.09 |
| 11,772,714 B2 * | 10/2023 | Harmon | ............... | B62D 33/08 296/183.1 |
| 2003/0141733 A1 * | 7/2003 | Burg | ............... | B60R 5/041 296/26.09 |
| 2009/0195007 A1 * | 8/2009 | Miller | ............... | B60P 3/40 296/26.11 |
| 2009/0284036 A1 * | 11/2009 | Clayton | ............... | B60P 3/40 296/26.09 |
| 2015/0225024 A1 | 8/2015 | Newberry | | |
| 2016/0214657 A1 * | 7/2016 | Topolovec | ............... | B62D 33/027 |
| 2016/0236724 A1 * | 8/2016 | Borges Filho | ............... | B60P 3/40 |
| 2017/0246980 A1 * | 8/2017 | Rodriguez, Jr. | ............... | B62D 33/08 |
| 2019/0329713 A1 * | 10/2019 | Sharma | ............... | B62D 33/023 |
| 2020/0114826 A1 * | 4/2020 | Stojkovic | ............... | H01M 10/6568 |
| 2020/0361389 A1 * | 11/2020 | Leitner | ............... | B60R 3/02 |
| 2021/0188368 A1 * | 6/2021 | Williams | ............... | B60P 3/40 |
| 2022/0388578 A1 * | 12/2022 | Gill | ............... | B62D 33/0273 |
| 2023/0256799 A1 * | 8/2023 | Harmon | ............... | B60J 7/1607 296/100.09 |
| 2023/0256891 A1 * | 8/2023 | Harmon | ............... | B62D 33/08 296/26.08 |
| 2023/0257030 A1 * | 8/2023 | Harmon | ............... | B62D 33/0273 296/183.1 |
| 2023/0257033 A1 * | 8/2023 | Harmon | ............... | B62D 33/08 296/183.1 |

OTHER PUBLICATIONS

Canoo, Pickup Truck, retrieved from https://www.canoo.com/pickup/ on Jan. 18, 2022.

* cited by examiner

EXTENDABLE CARGO BED SIDE WALL

TECHNICAL FIELD

This disclosure relates generally to a cargo bed of a vehicle and, more particularly, to a cargo bed having side walls that can be extended.

BACKGROUND

Some vehicles, such as pickup trucks, include a cargo bed. Users utilize cargo beds to carry various types of cargo. The cargo bed can be located behind a passenger compartment of the vehicle. A tailgate can enclose an aft end of the cargo bed.

SUMMARY

In some aspects, the techniques described herein relate to a cargo bed system, including: a side wall assembly of a cargo bed, the side wall assembly configured to transition back-and-forth between a standard wall position and an extended wall position, the side wall assembly including an extendable portion and a fixed portion, the extendable portion extending and retracting relative to the fixed portion when the side wall assembly transitions back-and-forth between the standard wall position and the extended wall position.

In some aspects, the techniques described herein relate to a cargo bed system, wherein the extendable portion includes a cargo holding surface.

In some aspects, the techniques described herein relate to a cargo bed system, wherein cargo coupled to the cargo holding surface is received within the fixed portion when the side wall assembly is in the standard wall position.

In some aspects, the techniques described herein relate to a cargo bed system, further including a taillight of the extendable portion, the taillight extending and retracting with the extendable portion relative to the fixed portion.

In some aspects, the techniques described herein relate to a cargo bed system, wherein the extendable portion is telescopically received within the fixed portion when the side wall assembly is in the standard wall position.

In some aspects, the techniques described herein relate to a cargo bed system, further including a grab handle that can be actuated to release the extendable portion such that the extendable portion can extend relative to the fixed portion of the side wall assembly.

In some aspects, the techniques described herein relate to a cargo bed system, wherein the side wall assembly is a driver side wall assembly, and further including a passenger side wall assembly, the passenger side wall assembly configured to transition back-and-forth between a standard wall position and an extended wall position.

In some aspects, the techniques described herein relate to a cargo bed system, wherein the cargo bed is configured to transition back-and-forth between an extended bed position and a standard bed position, the cargo bed having an extended area when in the extended bed position, wherein the extendable portion is configured to, when extended, provide a side wall of the extended area.

In some aspects, the techniques described herein relate to a cargo bed system, further including a tailgate assembly that provides a floor of the extended area.

In some aspects, the techniques described herein relate to a cargo bed system, further including a floor assembly configured to transition back-and-forth between a standard floor position and an extended floor position, the floor assembly including a plurality of floor sections each having a cargo support surface, at least some of the plurality of floor sections folded when the floor assembly is in the standard floor position and unfolded when the floor assembly is in the extended floor position, wherein the floor assembly provides a floor of the extended area when the floor assembly is in the extended floor position.

In some aspects, the techniques described herein relate to a cargo bed system, further including at least one step that is configured to move from a stowed position to a deployed position when the cargo bed is in the extended bed position.

In some aspects, the techniques described herein relate to a cargo bed adjustment method, including: transitioning a side wall assembly of a cargo bed from a standard wall position to an extended wall position by extending an extendable portion of the side wall assembly relative to a fixed portion of the side wall assembly.

In some aspects, the techniques described herein relate to a cargo bed adjustment method, wherein a taillight is mounted to the extendable portion of the side wall assembly such that the taillight extends and retracts with the extendable portion of the side wall assembly.

In some aspects, the techniques described herein relate to a cargo bed adjustment method, further including operating the taillight when the side wall assembly is in the extended wall position.

In some aspects, the techniques described herein relate to a cargo bed adjustment method, further including extending the extendable portion to provide access to a storage area within the side wall assembly when the side wall assembly is in the standard wall position.

In some aspects, the techniques described herein relate to a cargo bed adjustment method, wherein the side wall assembly is a first side wall assembly on a driver side, and further including transitioning a second side wall assembly from a standard wall position to an extended wall position by extending an extendable portion of the second side wall assembly relative to a fixed portion of the second side wall assembly.

In some aspects, the techniques described herein relate to a cargo bed adjustment method, wherein the extendable portion of the first side wall assembly and the extendable portion of the second side wall assembly provide opposing sides of an extended area of the cargo bed when the cargo bed is in an extended bed position.

In some aspects, the techniques described herein relate to a cargo bed adjustment method, further including transitioning the cargo bed back-and-forth between the extended bed position and a standard bed position, the cargo bed having the extended area when in the extended bed position.

In some aspects, the techniques described herein relate to a cargo bed adjustment method, further including transitioning the cargo bed from a standard bed position to an extended bed position by unfolding portions of a cargo bed floor and by extending the first side wall assembly and the second side wall assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a cargo bed for a vehicle. Side walls assemblies of the cargo bed can extend to extend the cargo bed and retract to retract the cargo bed. Taillights of the vehicle can move with the side wall assemblies to the extended position.

Figure 1:
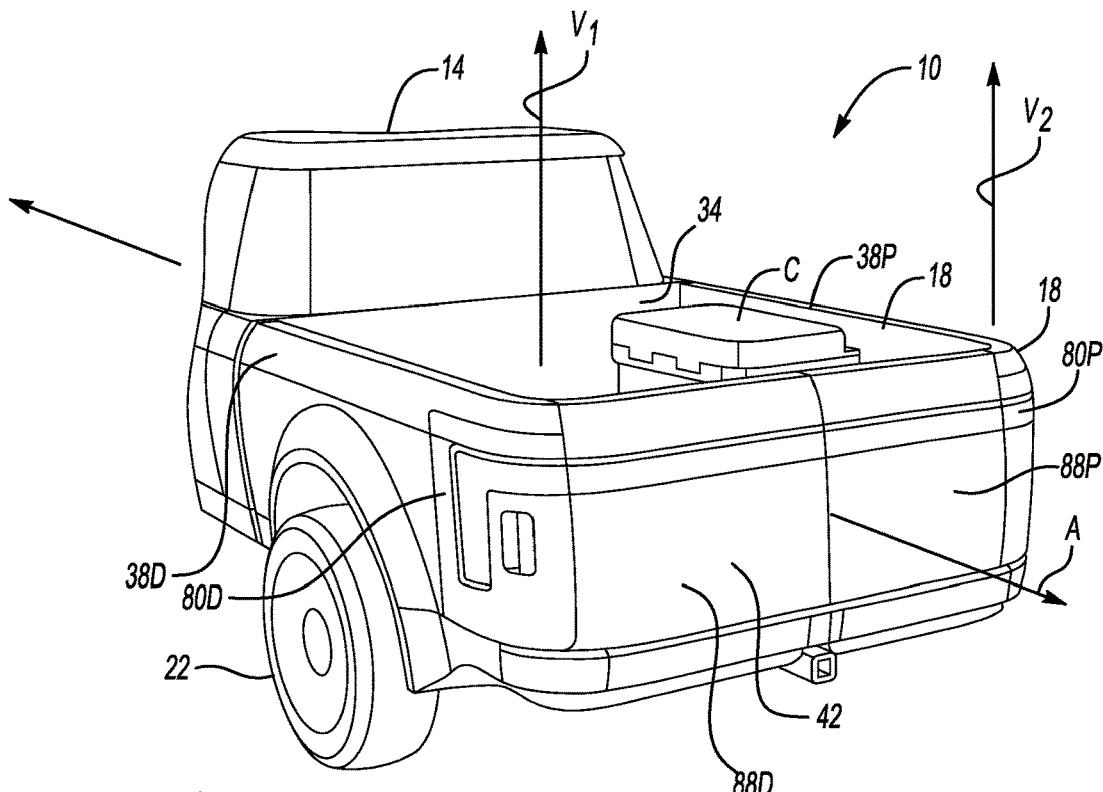
FIG. 1 illustrates a vehicle having a cargo bed with the cargo bed in a standard bed position.

With reference to FIGS. 1, a vehicle 10 includes a passenger compartment 14 and a cargo bed 18 that is aft the passenger compartment 14 along a longitudinal axis A of the vehicle 10.

In the exemplary embodiment, the vehicle 10 is a pickup truck. The vehicle 10 could be another type of vehicle in another example, such as a car, van, sport utility vehicle, etc. The vehicle 10 has a unibody architecture. In another embodiment, the vehicle 10 could have a body-on-frame architecture.

The example vehicle 10 is an electrified vehicle. In particular, the vehicle 10 is a battery electric vehicle. In another example, the vehicle 10 could be another type of electrified vehicle, such as a plug-in hybrid electric vehicle (PHEV), or a conventional vehicle.

The example vehicle 10 includes an electrified powertrain capable of applying a torque from an electric machine (e.g., an electric motor) to drive a pair of wheels 22. The vehicle 10 can include a traction battery pack, which powers the electric machine and, potentially, other electrical loads of the vehicle 10. The powertrain of the vehicle 10 may electrically propel the wheels 22 either with or without the assistance of an internal combustion engine.

FIG. 1 shows the cargo bed 18 in a standard position where the cargo bed 18 can hold cargo C. The cargo bed 18 can be transitioned from the standard bed position of FIG. 1 to the extended bed position of FIG. 2. In the extended bed position, the cargo bed 18 can transport cargo C', which is larger than the cargo C shown in FIG. 1. The cargo C' may be too large to comfortably fit in the cargo bed 18 when the cargo bed 18 is in the standard bed position, which causes the user to transition the cargo bed 18 to the extended bed position. The user could also transition the cargo bed 18 to the extended bed position to increase an overall carrying capacity of the cargo bed 18.

Figure 2:
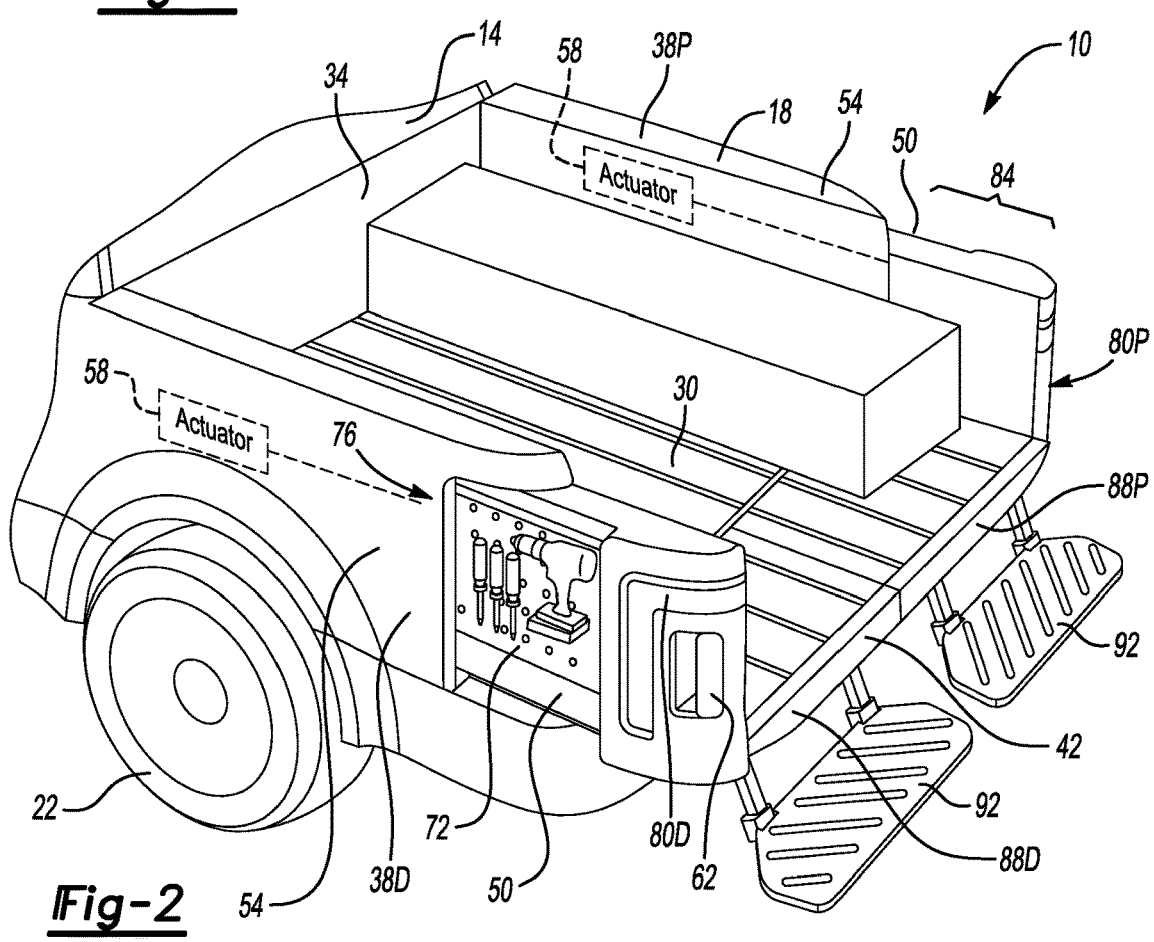
FIG. 2 illustrates the vehicle of FIG. 1 with the cargo bed in an extended bed position.

Generally, the cargo bed 18 includes a floor assembly 30, a front wall 34, a first side wall assembly 38D, a second side wall assembly 38P, and a tailgate assembly 42. The first side wall assembly 38D and the second side wall assembly 38P are each configured to transition back-and-forth between a standard wall position as shown in FIG. 1 and an extended wall position as shown in FIG. 2. The first side wall assembly 38D and the second side wall assembly 38P are parts of a cargo bed system that enables the cargo bed 18 to be transitioned back-and-forth between the standard bed position of FIG. 1 and the extended bed position of FIG. 2.

In this example, the first side wall assembly 38D and the second side wall assembly 38P each include an extendable portion 50 and a fixed portion 54. Each extendable portion 50 can extend and retract relative to the respective fixed portion 54. The extendable portions 50 are retracted when the cargo bed 18 is in the standard bed position. The extendable portions 50 are extended when the cargo bed 18 is in the extended bed position.

In this example, the extendable portions 50 are telescopically received within the respective fixed portions 54. Further, the extendable portion 50 of the first side wall assembly 38D and the extendable portion of the second side wall assembly 38P can extend and retract independently from one another. In another example, the extendable portion 50 of the first side wall assembly 38D and the extendable portion 50 of the second side wall assembly 38P extend and retract together.

In the exemplary embodiment, one or more actuators 58 is used to move the extendable portions 50 back-and-forth between the extended and retracted positions. The actuators 58 could be screw-driven linear actuators, for example. Instead, or additionally, a user could manually move the extendable portions back-and-forth between the extended and retracted positions. The actuators 58 could extend and retract in response to command from a button on the vehicle 10 or an input from a handheld device, such as a smartphone.

In the exemplary embodiment, a grab handle 62 can be actuated to release the extendable portion 50 of the first side wall assembly 38D so that the extendable portion 50 of the first side wall assembly 38D can extend relative to the fixed portion 54. A grab handle can additionally or instead be included within the extendable portion 50 of the second side wall assembly 38P.

The exemplary extendable portions 50 each include at least one cargo holding surface 72. Tools and other accessories can be coupled to the cargo holding surface 72. The tools and other accessories could simply rest on the cargo holding surface 72 or could hang from the cargo holding surface 72.

The tools and other accessories coupled to the cargo holding surface 72 extend and retract as part of the extendable portions 50. When the extendable portions 50 are extended, the tools and other accessories 76 can be accessed. When the extendable portions 50 are retracted, the tools and other accessories 76 are received within the respective fixed portion 54, which secures and protects the sidewall cargo 104. The example first side wall assembly 38D and second side wall assembly 38P thus include storage areas that can be access by extending the respective extendable portion 50. The extendable portions 50 could be locked when retracted to prevent unauthorized access to the tools and other accessories 76 that are coupled to the cargo holding surface 72.

When the extendable portions 50 are extended, a cover could be used to conceal and secure the tools and other accessories 76 coupled to the cargo holding surface 72. The cover could be a separate lockable door that conceals and secures the tools and other accessories 76 when the first side wall assembly 38D and the second side wall assembly 38P are extended. A lockable door could be used in connection with the first side wall assembly 38D. Another lockable door could be used in connection with the second side wall assembly 38P. Instead or additionally, the tools and other accessories 76 could couple to a cargo holding surface that faces into the cargo bed 18. A tonneau cover could then cover the cargo bed 18 to secure those tools and other accessories.

The example first side wall assembly 38D and second side wall assembly 38P thus include storage areas that can be accessed by extending the respective extendable wall section 50. The extendable wall sections 50 could be locked when retracted to prevent unauthorized access to the sidewall cargo 104 that is coupled to the cargo holding surface 100.

When the extendable portions 88 are extended, a cover could be used to conceal and secure tools and other accessories coupled to the cargo holding surface 98. Instead or additionally, the tools and other accessories could couple to a cargo holding surface of the extendable portions 88 that faces into the cargo bed 18. A tonneau cover could then cover the cargo bed 18 to secure those tools and other accessories.

A first taillight 80D is part of the extendable portion 50 of the first side wall assembly 38D. A second taillight 80P is part of the extendable portion 50 of the second side wall assembly 38P. The first and second taillights 80D, 80P extend and retract with the corresponding extendable portions 50 of the first and second side wall assemblies 38D, 38P. The first and second taillights 80D, 80P extend rearward and are operational when the extendable portions 88 are extended. Thus, there may be no need to add additional lighting when operating the vehicle 10 with extendable portions 50 extended as shown in FIG. 2 and the cargo bed 18 in the extended bed position. In addition to the first and second taillights 80D, 80P, the extendable portions 50 could also include sensors (e.g., blindspot monitoring sensors, sonar) that operate when the extendable portions 88 are in the extended position and when the extendable portions 88 are in the retracted position. Thus, adding additional sensors when the cargo bed 18 is in the extended bed position may not be required.

In this example, the tailgate assembly 42 is pivoted from the closed position of FIG. 1 to the open position of FIG. 2 to provide a floor area for an extended area 84 of the cargo bed 18. The cargo bed 18 has the extended area 84 when the cargo bed 18 is the extended bed position. In this example, the extendable portions 50 of the first and second side wall assemblies 38D, 38P, when extended, provide respective side walls of the extended area 84 of the cargo bed 18 when the cargo bed 18 is in the extended bed position.

The tailgate assembly 42 of the example vehicle 10 is a split tailgate having a first tailgate door 88D and a second tailgate door 88P. In addition to pivoting together about a horizontal axis back-and-forth between the closed position of FIG. 1 and the open position of FIG. 2, the first tailgate door 88D is configured to pivot about a first vertically extending axis $V_1$ back-and-forth between a closed position and a fully open position. Further The second tailgate door 88P is configured to pivot about a second vertically extending axis $V_2$ back-and-forth between a closed position and a fully open position. The first tailgate door 88D and the second tailgate door 88P can additionally pivot together about a horizontally extending axis.

In this example, the first tailgate door 88D is on a driver side of the vehicle 10, and the second tailgate door 88P is on the passenger side of the vehicle 10. The first tailgate door 88D and the second tailgate door 88P are similarly sized in this example. The exemplary first tailgate door 88D and the second tailgate door 88P each account for about fifty percent of the tailgate assembly 42.

In the exemplary embodiment, the vehicle 10 includes two steps 92 that independently can pivot out from beneath the cargo bed 18 of the vehicle 10 to the position of FIG. 2. A user can use the steps 92 to help enter and exit the cargo bed 18. The steps 92 are shown in a deployed position in FIG. 2. When not needed, the steps 92 can be retracted beneath the vehicle 10 in a stowed position.

To adjust the cargo bed 18 from the standard bed position of FIG. 1 to the extended bed position of FIG. 2, the tailgate assembly 42 is pivoted about a horizontal axis from the position of FIG. 1 to the position of FIG. 2. The extendable portions 50 of the first side wall assembly 38D and the second side wall assembly 38P are then extended. This can be in response to a user releasing the grab handle 62 and initiating the actuators 58 to start moving the extendable portions 88.

If the vehicle 100 is in the standard position of FIG. 1, and a user wants to access tools and accessories 76, the user can extend the extendable portion 50 of the first side wall assembly 38D and then return that extendable portion to the retracted position of FIG. 1.

Figure 3:
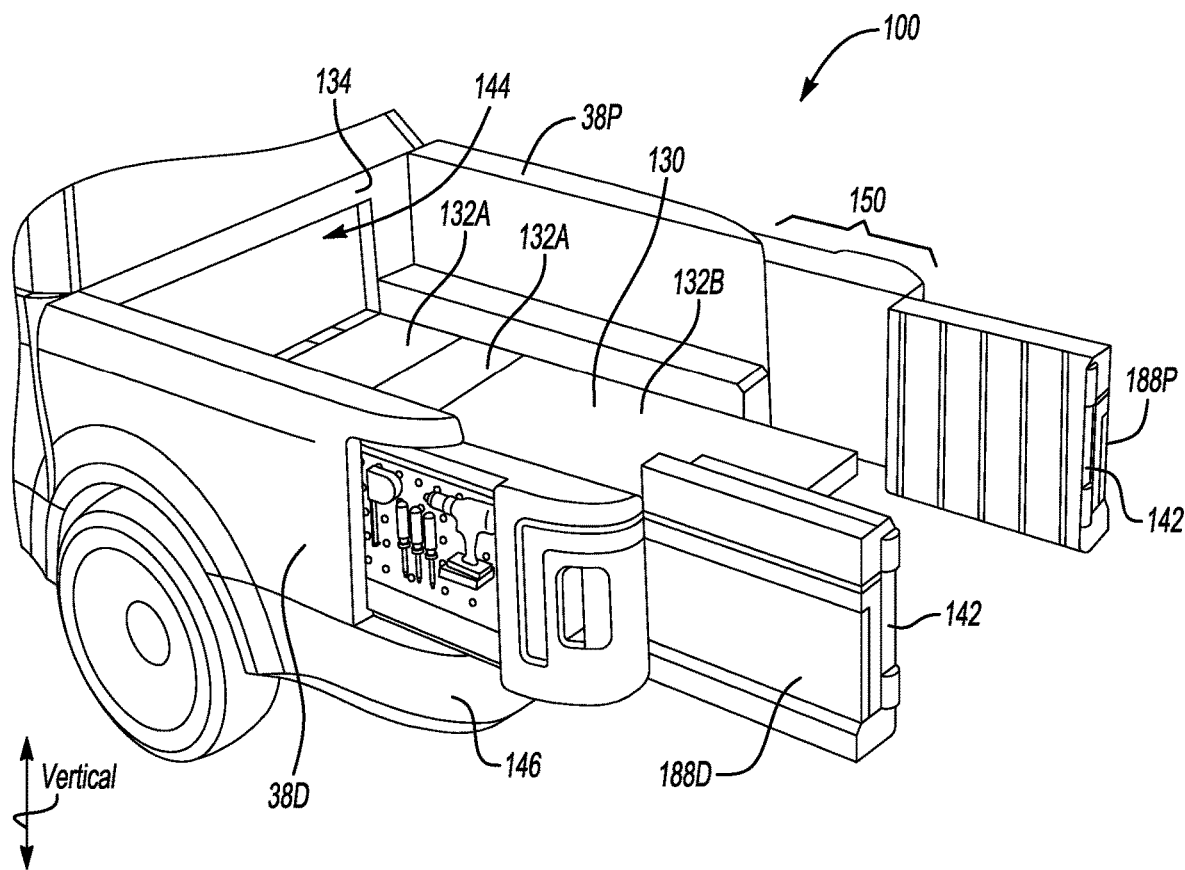
FIG. 3 illustrates a vehicle with a cargo bed in an extended position according to another exemplary embodiment.
Figure 4:
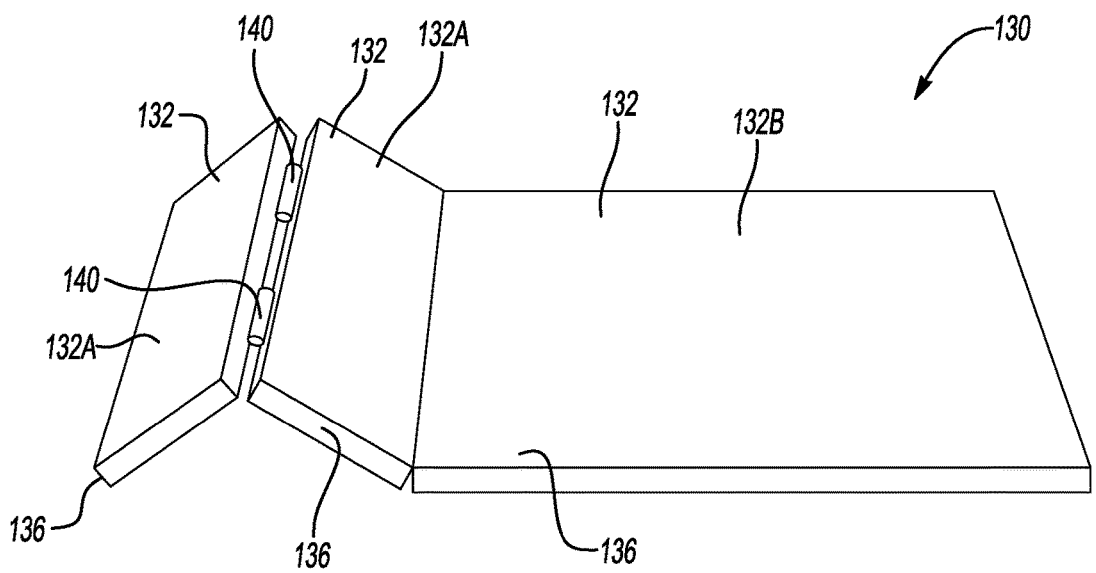
FIG. 4 illustrates a floor of a cargo bed according to another exemplary aspect of the present disclosure.

With reference to FIGS. 3 and 4, another exemplary embodiment includes a vehicle 100 having a cargo bed 118 that can transition from a standard bed position to the extended bed position of FIG. 3. In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

The cargo bed 118 of the vehicle 100 has a floor assembly 130 that unfolds to provide a floor for an extended area 150 of the cargo bed 118 when the cargo bed 118 is in the extended bed position.

When the cargo bed 118 is in the standard bed position, the floor assembly 130 is folded and in a standard floor position. When the cargo bed 118 is in the extended bed position, the floor assembly 130 is in an extended floor position.

The floor assembly 130 includes a plurality of floor sections 132 each having a cargo support surface 136. When the floor sections 132 are used to support cargo, the cargo support surfaces 136 face vertically upwards and directly support and interface with the cargo. Vertical, for purposes of this disclosure, is with reference to ground and a general orientation of the vehicle 10, 100 during ordinary operation.

In this example, the floor sections 132 of the floor assembly 130 include two pivotable floor sections 132A, and one slidable floor section 132B. The two pivotable floor sections 132A are arranged one in front of the other along a longitudinal axis of the vehicle 100. More than two pivotable floor sections 132A could be used in other examples. More than two pivotable floor sections 132A are not used in this example, which reduces overall part complexity.

The pivotable floor section 132A in the front is pivotably connected the front wall 134 and to the other pivotable floor section 132A. The pivotable floor section 132A in the back is connected to the slidable floor section 132B and to the other pivotable floor section 132A. Hinge assemblies 140, for example, could be used to pivotably connect the pivotable floor sections 132A.

When the cargo bed 118 is in the standard bed position, the floor assembly 30 is in a standard floor position. In the standard floor position, the pivotable floor sections are pivoted to a position where the pivotable floor sections 132A are folded against one together and folded against the front wall 134. In particular, the pivotable floor sections 132A are stacked against the front wall 134. The pivotable floor sections 132A can be received within a recess 144 of the front wall 134 when folded in this way.

When the cargo bed 118 is in the standard bed position, the cargo support surface 136 of the front pivotable floor section 132A faces forward along the longitudinal axis of the vehicle 100, and the cargo support surface 136 of the aft pivotable floor section 132A faces aft along the longitudinal axis.

The slidable floor section 132B slides when transitioning the floor assembly 130 back-and-forth between the standard floor position and the extended floor position. In this example, the slidable floor section 132B slides without pivoting when the floor assembly 130 is transitioned back-and-forth between the standard floor position and the extended floor position.

When the cargo bed 118 is in the extended bed position, the floor assembly 130 is in the extended floor position. In the extended floor position, the pivotable floor section 132A are pivoted to a position where the pivotable floor sections 132A are unfolded. The pivotable floor sections 132A fold and unfold like an accordion in this example.

In the extended floor position, the cargo support surfaces 136 of the floor sections 132 of the floor assembly 130 all face vertically upward. Also, the floor sections 132 are all disposed next to each other along the longitudinal axis of the vehicle 100.

When in the extended bed position, the slidable floor section 132B is slid rearward such that an area of the slidable floor section 132B extends rearward past a rear bumper 146 of the vehicle 100.

The tailgate door 188D and the tailgate door 188P can be pivoted about respective vertical extending axes when the floor assembly 130 is in the extended floor position. The tailgate assembly 142 of the vehicle 100 does not provide a floor for the extended area 150. Tools, accessories, gear, etc., can be mounted on the first tailgate door 188D and the second tailgate door 188P as shown.

Moving the extendable portions 50 of the side wall assembly 38D and the side wall assembly 38P can pull and extend the floor assembly 130 until the floor assembly 130 is in the extended floor position of FIG. 3.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A cargo bed system, comprising:
a side wall assembly of a cargo bed, the side wall assembly configured to transition back-and-forth between a standard wall position and an extended wall position, the side wall assembly including an extendable portion and a fixed portion, the extendable portion extending and retracting relative to the fixed portion when the side wall assembly transitions back-and-forth between the standard wall position and the extended wall position, wherein the extendable portion includes a cargo holding surface, wherein cargo coupled to the cargo holding surface is received within the fixed portion when the side wall assembly is in the standard wall position, the cargo holding surface configured to hold cargo.

2. The cargo bed system of claim 1, further comprising a taillight of the extendable portion, the taillight extending and retracting with the extendable portion relative to the fixed portion.

3. The cargo bed system of claim 1, wherein the extendable portion is telescopically received within the fixed portion when the side wall assembly is in the standard wall position.

4. The cargo bed system of claim 1, further comprising a grab handle that can be actuated to release the extendable portion such that the extendable portion can extend relative to the fixed portion of the side wall assembly.

5. The cargo bed system of claim 1, wherein the side wall assembly is a driver side wall assembly, and further comprising a passenger side wall assembly, the passenger side wall assembly configured to transition back-and-forth between a standard wall position and an extended wall position.

6. The cargo bed system of claim 1, wherein the cargo bed is configured to transition back-and-forth between an extended bed position and a standard bed position, the cargo bed having an extended area when in the extended bed position, wherein the extendable portion is configured to, when extended, provide a side wall of the extended area.

7. The cargo bed system of claim 6, further comprising a tailgate assembly that provides a floor of the extended area.

8. The cargo bed system of claim 6, further comprising a floor assembly configured to transition back-and-forth between a standard floor position and an extended floor position, the floor assembly including a plurality of floor sections each having a cargo support surface, at least some of the plurality of floor sections folded when the floor assembly is in the standard floor position and unfolded when the floor assembly is in the extended floor position, wherein the floor assembly provides a floor of the extended area when the floor assembly is in the extended floor position.

9. The cargo bed system of claim 6, further comprising at least one step that is configured to move from a stowed position to a deployed position when the cargo bed is in the extended bed position.

10. The cargo bed system of claim 1, further comprising a cover that conceals cargo held by the cargo holding surface when the extendable portion is in the extended wall position.

11. The cargo bed system of claim 2, wherein, when the side wall assembly is in the standard wall position, the taillight of the extendable portion is disposed vertically beneath some of the fixed portion.

12. A cargo bed adjustment method, comprising:
transitioning a side wall assembly of a cargo bed from a standard wall position to an extended wall position by extending an extendable portion of the side wall assembly relative to a fixed portion of the side wall assembly; and
during the extending, providing access to a storage area within the extendable portion of the side wall assembly.

13. The cargo bed adjustment method of claim 12, wherein a taillight is mounted to the extendable portion of the side wall assembly such that the taillight extends and retracts with the extendable portion of the side wall assembly.

14. The cargo bed adjustment method of claim 13, further comprising operating the taillight when the side wall assembly is in the extended wall position.

15. The cargo bed adjustment method of claim 12, wherein the side wall assembly is a first side wall assembly on a driver side, and further comprising transitioning a second side wall assembly from a standard wall position to an extended wall position by extending an extendable portion of the second side wall assembly relative to a fixed portion of the second side wall assembly.

16. The cargo bed adjustment method of claim 15, wherein the extendable portion of the first side wall assembly and the extendable portion of the second side wall assembly provide opposing sides of an extended area of the cargo bed when the cargo bed is in an extended bed position.

17. The cargo bed adjustment method of claim 16, further comprising transitioning the cargo bed back-and-forth between the extended bed position and a standard bed position, the cargo bed having the extended area when in the extended bed position.

18. The cargo bed adjustment method of claim 15, further comprising transitioning the cargo bed from a standard bed position to an extended bed position by unfolding portions of a cargo bed floor, by sliding other portions of the cargo bed floor, and by extending the first side wall assembly and the second side wall assembly.

19. The cargo bed adjustment of claim 13, wherein the taillight is received vertically beneath a section of the fixed portion of the side wall assembly when the side wall assembly is in the standard wall position.

\* \* \* \* \*